Figure 1:
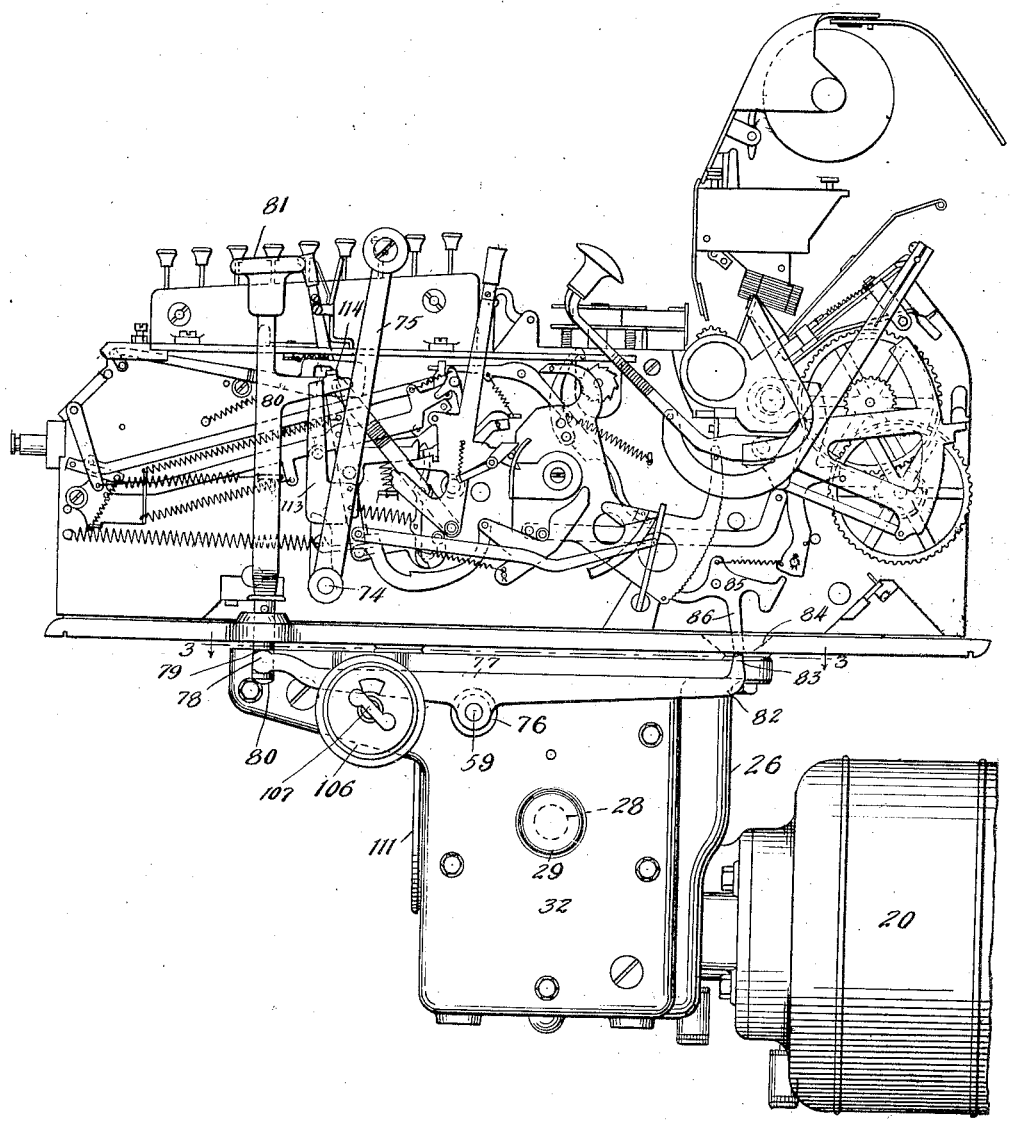

F. A. NIEMANN.
MOTOR DRIVEN ADDING MACHINE.
APPLICATION FILED APR. 27, 1908.

976,390.

Patented Nov. 22, 1910.
7 SHEETS—SHEET 1.

Witnesses:
Wm. Geiger
H. W. Munday

Inventor:
Frederick A. Niemann
By Munday, Evarts, Adcock & Clarke,
Attorneys

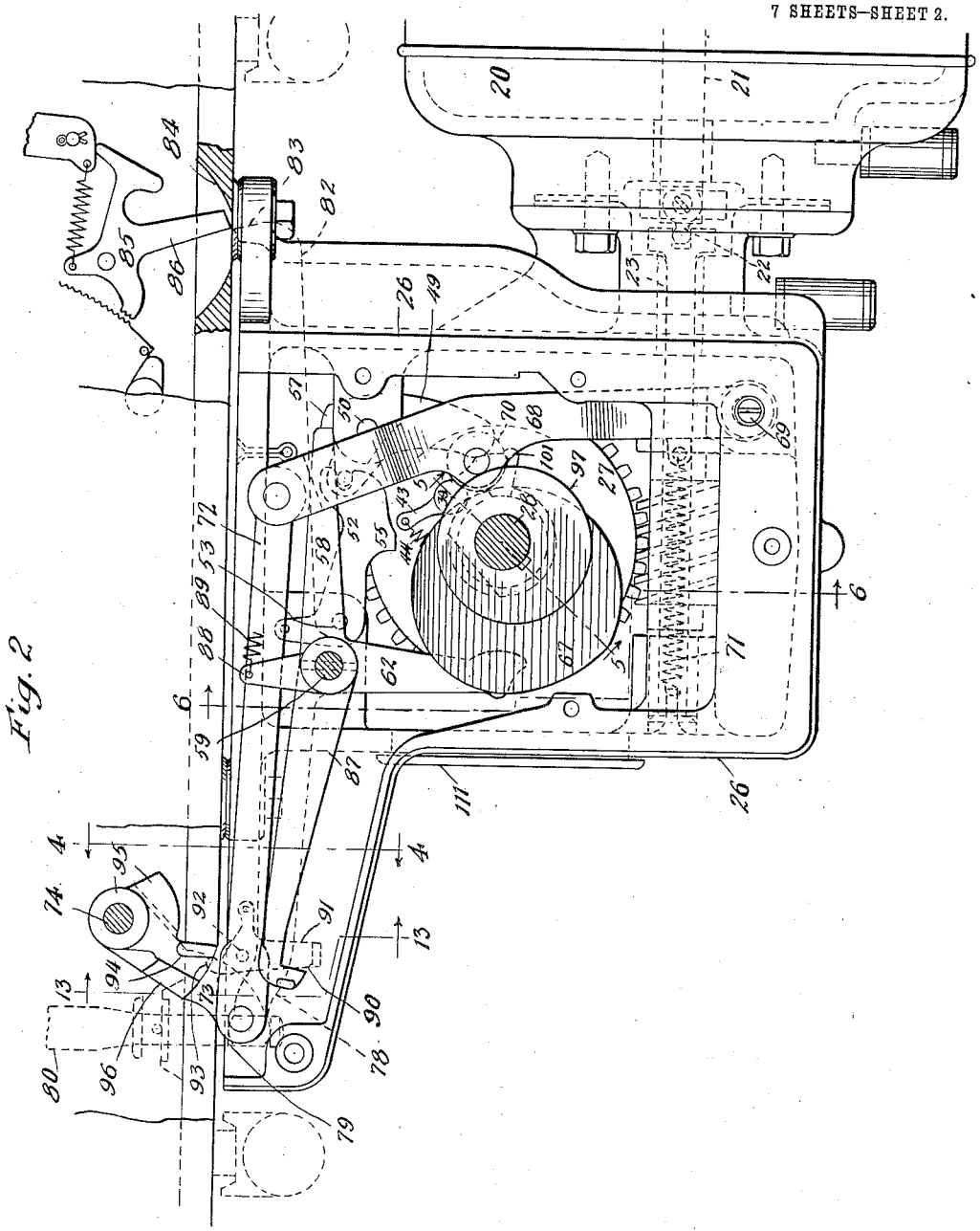

F. A. NIEMANN.
MOTOR DRIVEN ADDING MACHINE.
APPLICATION FILED APR. 27, 1908.
976,390.
Patented Nov. 22, 1910.
7 SHEETS—SHEET 3.
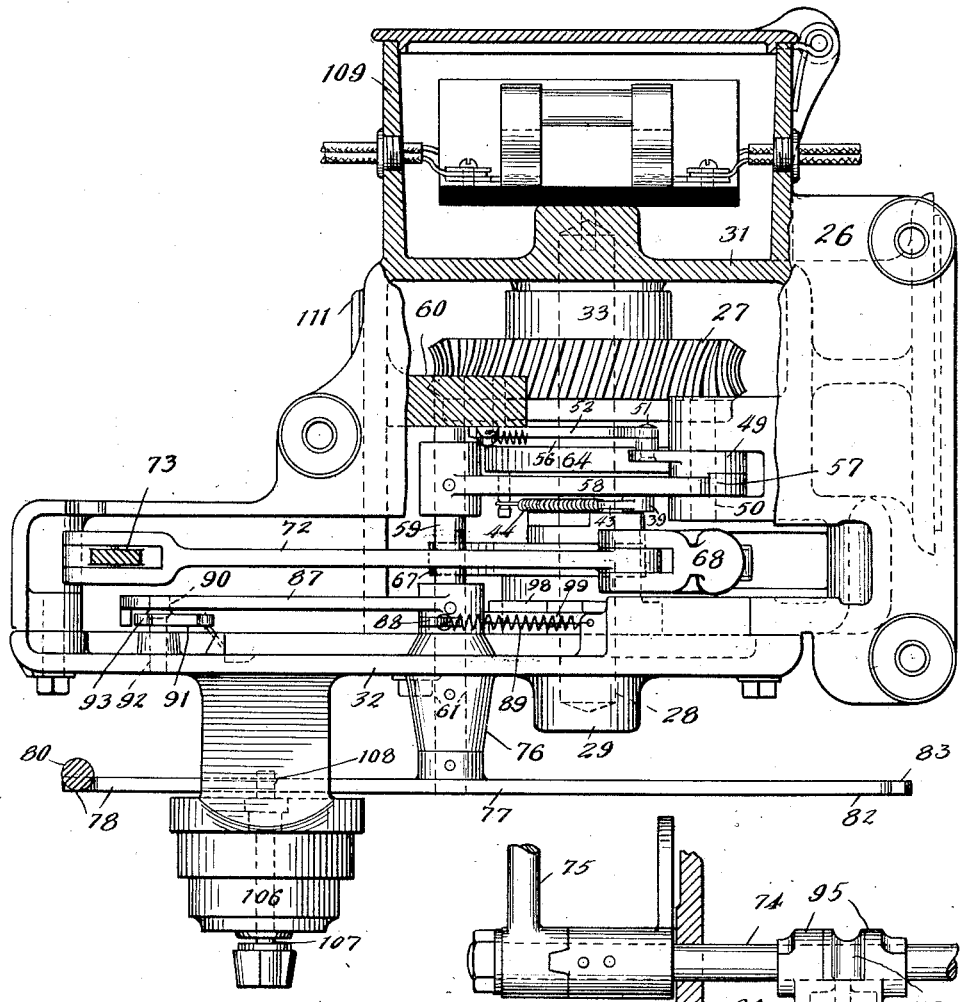
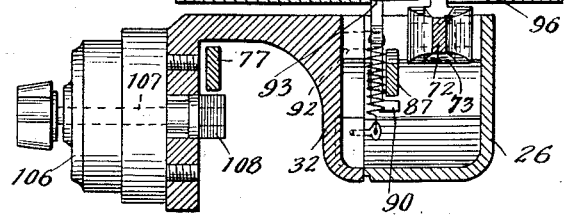
Witnesses:
Wm. Geiger
H. W. Munday.
Inventor:
Frederick A. Niemann
By Munday, Evarts, Adcock & Clarke.
Attorneys F. A. NIEMANN.
MOTOR DRIVEN ADDING MACHINE.
APPLICATION FILED APR. 27, 1908.
976,390.
Patented Nov. 22, 1910.
7 SHEETS—SHEET 4.
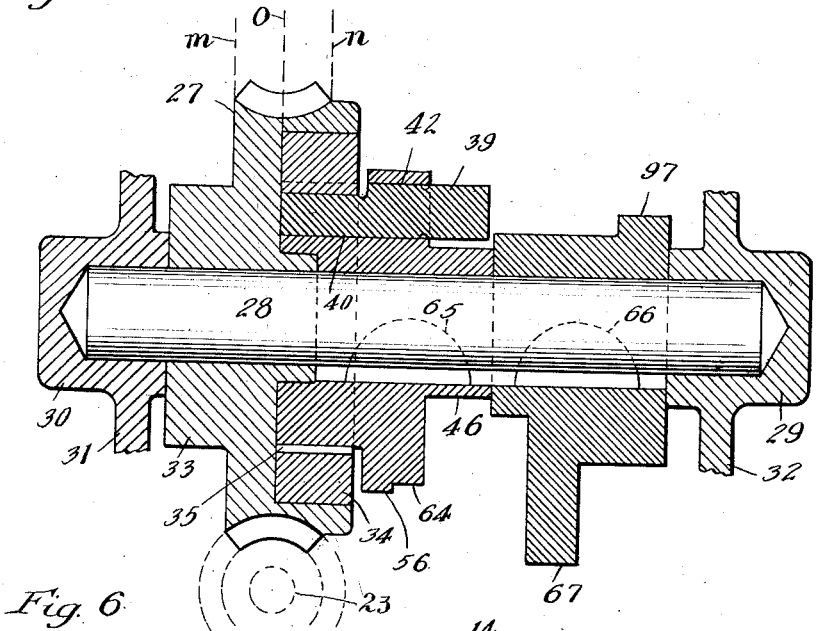
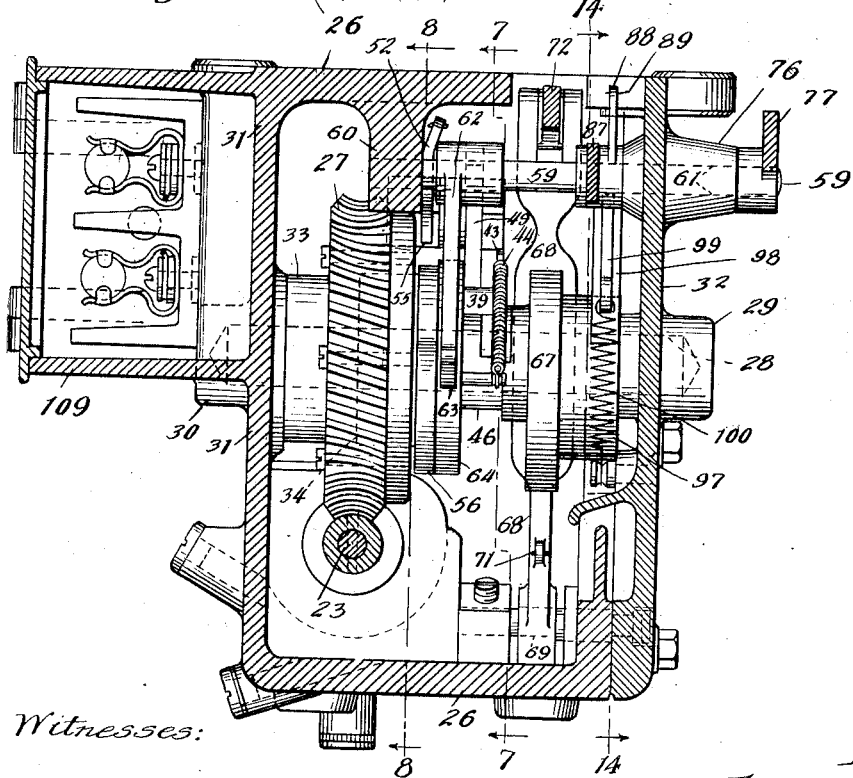
Witnesses:
Wm. Geiger
H. W. Munday
Inventor:
Frederick A. Niemann
By Munday, Evarts, Adcock & Clarke,
Attorneys

F. A. NIEMANN.
MOTOR DRIVEN ADDING MACHINE.
APPLICATION FILED APR. 27, 1908.

976,390.

Patented Nov. 22, 1910.

7 SHEETS—SHEET 5.

Witnesses:
Wm. Geiger
H. W. Munday

Inventor:
Frederick A. Niemann
By
Munday, Evarts, Adcock & Clarke
Attorneys

F. A. NIEMANN.
MOTOR DRIVEN ADDING MACHINE.
APPLICATION FILED APR. 27, 1908.
976,390.
Patented Nov. 22, 1910.
7 SHEETS—SHEET 6.
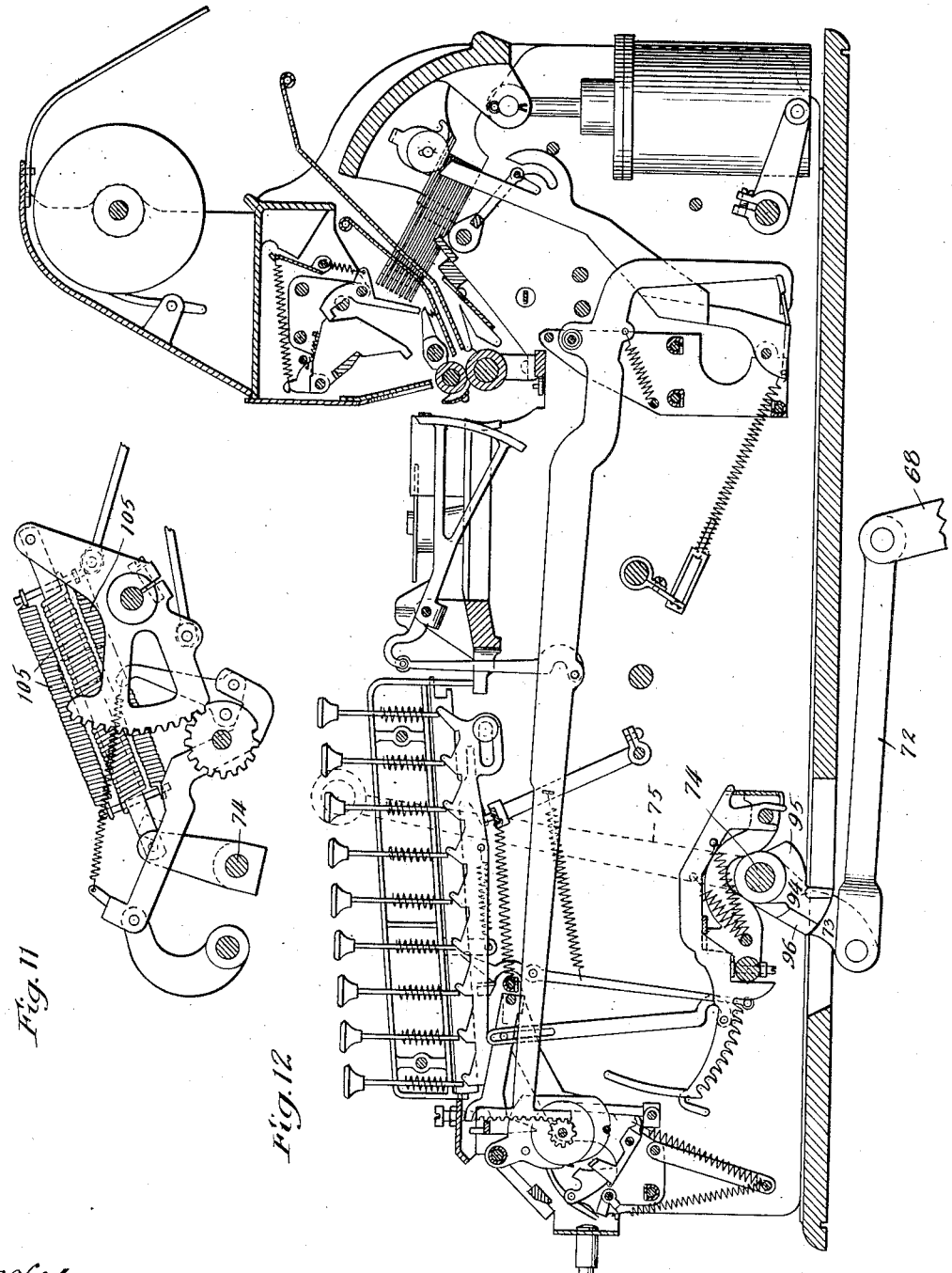
Witnesses:
Wm. Geiger
H. W. Munday
Inventor:
Frederick A. Niemann.
By Munday, Evarts, Adcock & Clarke.
Attorneys F. A. NIEMANN.
MOTOR DRIVEN ADDING MACHINE.
APPLICATION FILED APR. 27, 1908.
976,390.
Patented Nov. 22, 1910.
7 SHEETS—SHEET 7.
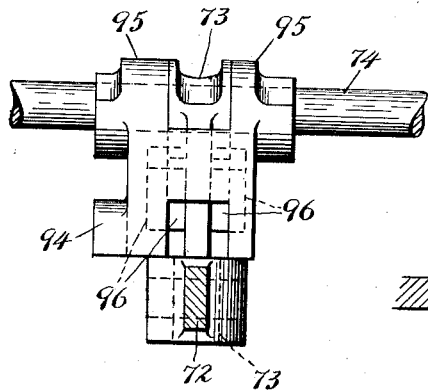
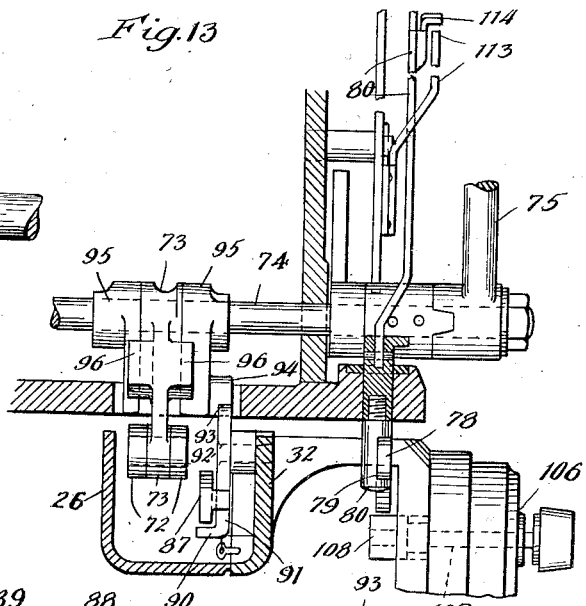
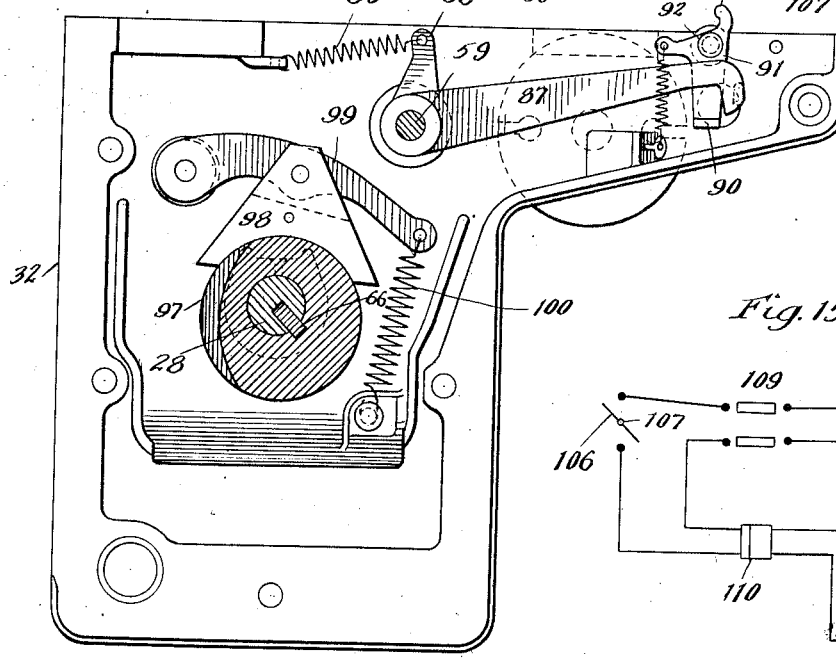
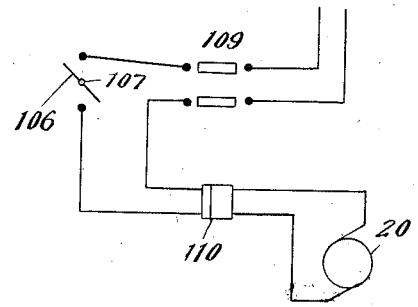
Witnesses:
Wm. Geiger
H. W. Munday
Inventor:
Frederick A. Niemann
By Munday, Evarts, Adcock & Clarke,
Attorneys ized Nov. 22, 1910.

UNITED STATES PATENT OFFICE.

FREDERICK A. NIEMANN, OF CHICAGO, ILLINOIS, ASSIGNOR TO COMPTOGRAPH COMPANY, OF CHICAGO, ILLINOIS, A CORPORATION OF ILLINOIS.

MOTOR-DRIVEN ADDING-MACHINE.

976,390.  Specification of Letters Patent.  Patented Nov. 22, 1910.

Application filed April 27, 1908. Serial No. 429,374.

*To all whom it may concern:*

Be it known that I, FREDERICK A. NIEMANN, a citizen of the United States, residing in Chicago, in the county of Cook and State of Illinois, have invented a new and useful Improvement in Motor-Driven Adding-Machines, of which the following is a specification.

My invention relates to the utilization of a continuously running motor for the power driving of a printing adding machine such as, for instance, the well known comptograph; and it has for its particular objects the providing of effective means for clutching to such motor, and for controlling, the connections whereby the adding machine is operated.

The idea of providing a continuously running motor and such connections that the adding machine may be operated either by such motor or by its hand lever, is of course old in the art, and is disclosed in such prior patents as, for instance, the patent to Rinsche No. 726,803. And the idea of so applying such continuously running motor and connecting means that the main rock shaft of the adding machine will be positively rocked by the motor in one direction and left free to return under its own spring tension in the other direction, is also old in the art and is disclosed in such prior patents as, for instance, the patent to McBerty, No. 762,928. And the idea of controlling the actuation of the rock shaft of an adding or registering machine by means of a power driven cam bearing against an oscillating lever-connection, is also old in the art and is disclosed, in, for instance, Figure 11, etc., of the patent to Weiss, No. 512,641. And various specific clutching means and controlling connections may perhaps be disclosed in other patents prior to my present invention. But my present invention accomplishes by peculiarly effective, simple, and durable means, the requisite clutching of the continuously running motor and the requisite control of the adding machine connections, as will hereinafter appear.

Figure 7:
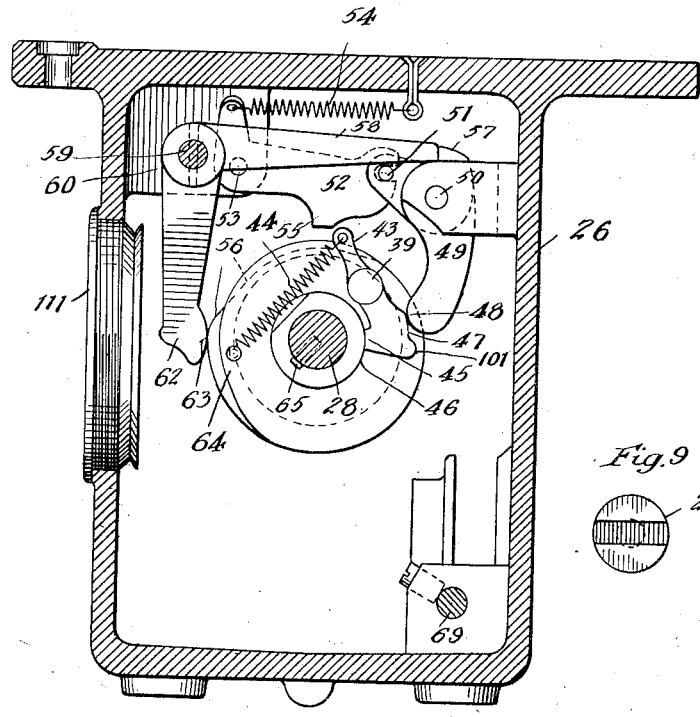
Figures 9, 10:
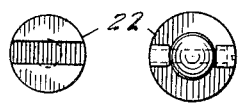
Figure 8:
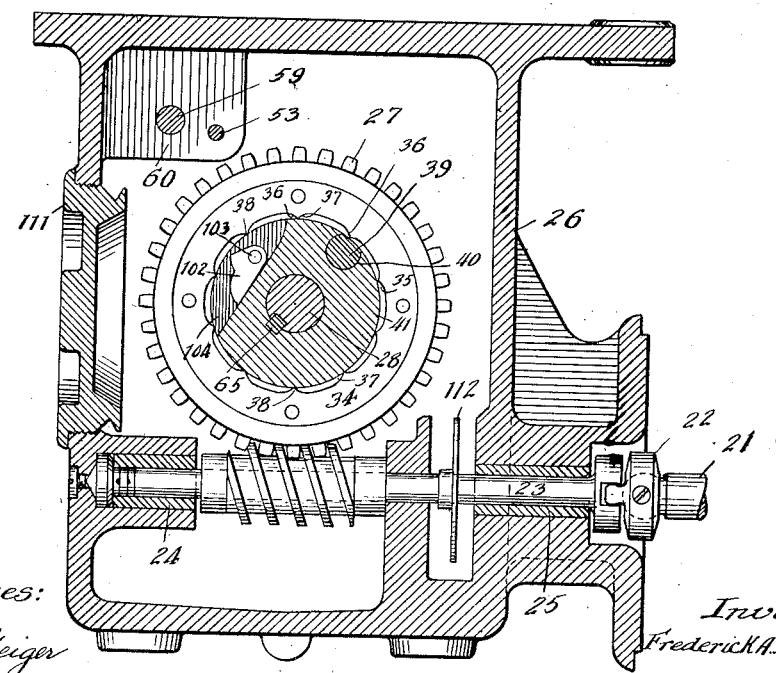

In the accompanying drawings forming a part of this specification, Fig. 1 is a side elevation of the entire assembled device, showing the motor and its connections as applied to an improved comptograph, such comptograph being shown with its outer casing removed and being substantially like the machine disclosed in the patent to Felt et al., No. 853,543, and some other prior patents to Felt; such as #749177, #694955, #644287, #628176 and so forth; Fig. 2 is a side elevation of the complete motor-drive mechanism, with the detachable vertical wall of the drive-frame box removed, and also shows the main rock-shaft and the paper-lock dog of the adding-machine; Fig. 3 is a top plan view of the motor-drive mechanism, with the top of the drive-frame box broken away and the fuse-box casing sectioned; Fig. 4 is a section on line 4—4 of Fig. 2, showing a fragmentary rear elevation of the main rock-shaft, the base of the operating handle, the rock-arms upon which the motor-drive connection operates, the interlocking spring-pawl co-acting with one of said rock-arms, and the switch key for the motor circuit, with the said spring pawl shown in relation to a section of the interlocking arm of the trip shaft, and with the inner end of the switch key shown in locking relation with a section of the forward connection-arm of the trip-shaft; Fig. 5 is a fragmentary view, showing, in front elevation, the main cam-shaft, and, in vertical section, its bearings and the worm gear and clutch-ring and clutch-hub forging and main-cam forging, with the clutch-dog also sectionally shown in place in the clutch-hub forging and engaged with the clutch-ring; Fig. 6 is a section of the drive-frame box and the attached fuse-box, on the line 6—6 of Fig. 2, showing the worm gear and the cam mechanisms in plan; Fig. 7 is a section on line 7—7 of Fig. 6 showing, in elevation, the clutch-lever and its spring, the clutch throw-out levers, the trip arm and the trip-controlling arm, the clutch throw-out controlling-cam, the trip-controlling cam, and the outer hub of the clutch-hub forging; Fig. 8 is a section on line 8—8 of Fig. 6, showing, in elevation, the worm-shaft and its coupling to the motor-shaft, and the worm-gear and clutch-ring, and, in section, the clutch-hub, cam-shaft, and clutch-dog, with the secondary safety clutch-dog shown in place in its segmental recess of the clutch-hub; Figs. 9 and 10 are details of the respective mutually engaging ends of the worm-shaft and motor-shaft, forming the coupling between said shafts; Fig. 11 is a detail elevation to show the main spring-connection between the main rock-shaft of the adding machine and the secondary rock-shafts from which the operating movement is imparted to the adding and printing mechanism; Fig. 12 is a vertical longitudinal section of the adding and printing mechanism, also showing the main rock-shaft and its connection with the motor-drive mechanism; Fig. 13 is a section on line 13—13 of Fig. 2, showing a front elevation of the parts shown in rear elevation in Fig. 4, together with the guard device interlocking the total lever and the motor-operating key-stem when said total lever is improperly displaced; Fig. 14 is a section on line 14—14 of Fig. 6, showing, in elevation, the inner face of the detachable vertical wall of the drive-frame box, the fiber brake-shoe and its spring-held supporting lever, the interlocking arm and tensioning spring of the trip-shaft, and the spring pawl coacting with said interlocking arm, with a sectional view through the brake eccentric on the main cam shaft; Fig. 15 is a diagram of the electrical circuit showing the switch key, the motor, and the fuses and slip-connection interposed in such circuit; and Fig. 16 is a detail rear elevation of the crank-arm connections between the main rock-shaft of the adding-machine and the link that leads to the main-cam lever of the motor-drive, said link being shown sectioned transversely.

Like reference numerals indicate like parts in all of the figures.

20 is the continuously running electric motor, specially wound for the intended service, and actuating the motor shaft 21, said motor shaft 21 being connected, by the key-and-socket flexible joint 22, with the worm-shaft 23 journaled, at 24 and 25, in the drive-frame box 26 (Fig. 8.) Said worm-shaft meshes with the driving worm-gear 27, freely rotating on the driven cam-shaft 28, journaled, at 29 and 30, in respectively the fixed wall 31 and opposed detachable wall 32 of the drive-frame box, said cam-shaft being above and transverse of the aforesaid worm-shaft (Fig. 6.) The supporting hub 33 of the worm-gear, rotating on the cam shaft, is projected laterally, toward the fixed vertical wall of the drive-frame box, beyond the zone included between the transverse vertical planes m, n at either limit of the meshing of the worm-gear with the worm (Fig. 5), and within said zone the said worm gear is interiorly provided with a rigidly secured hardened clutch-ring 34, said clutch-ring being of more than half of the horizontal width of the aforesaid meshing-zone of the worm-gear and having internally a continuous uninterrupted series of curvilinear clutch-notches 35 (Fig. 8.) Each of said clutch-notches, concavely facing the axis of rotation of this driving clutch-ring, is formed on a compound curve whereof the opposite ends 36 and 37, approaching the apical knife-edges 38 that separate such adjacent cam-notches, are on the same radial curvature as the clutch-dog 39 that is designed to engage them; and the intermediate portion of each clutch-notch is on a flatter curve of greater radius. The clutch dog 39 is mounted to oscillate freely in the segmental socket 40 laterally opening on the peripheral edge of the driven clutch-hub 41 within the driving clutch-ring (Fig. 8.) The clutching portion of the said clutch-dog is of substantially the same segmental or D-shaped form as the aforesaid peripheral segmental socket in the clutch-hub, and when the clutch-hub is at rest, the said clutching portion of the clutch-dog is entirely within said socket and the knife-edge apices of the clutch-notches in the driving clutch-ring pass freely over the peripheral opening of said socket. But when the clutch-dog is oscillated, to effect the clutching action, a segment of its clutching portion is protruded through said opening and beyond the periphery of the clutch-hub, to intercept and be engaged by the rearward curved wall of whatever clutch-notch is then passing said dog, so that the clutch-ring will thereby pick up and drive forward the said clutch-hub; and the release of said hub from said ring is effected by the return oscillation of the clutch-dog, into its retaining socket within said hub's periphery, when said hub has been driven one full rotation. The clutching action thus takes place within the meshing zone of the worm-gear with the worm, the horizontal engagement of the clutch-dog with the clutch-ring reaching inward to the median vertical plane o (Fig. 5) of the meshing of the worm-gear with the worm-shaft, so that the shock and strain of the clutching action centers in said meshing zone of the worm-gear with the worm-shaft, and lateral strain and twisting of said worm-gear are reduced to a minimum, with the result that the wear and tear between the intermeshing teeth of the worm-gear and the worm-shaft are reduced to a negligible quantity and the constant maximum efficiency of driving action of said worm-shaft upon said worm-gear is obtained and insured.

The outward prolongation of the oscillating clutch-dog, away from the worm-gear and toward the detachable wall of the drive-frame box, is journaled and oscillates in the hole 42 penetrating the outward portion of the forging of which the clutch-hub is an integral part (Fig. 5;) and the outer end of the said clutch-dog has transverse to it and integral with it the clutch-lever 43, to one arm of which is attached one end of the clutch-lever spring 44 whereby is effected the oscillation of the clutch-dog into clutching relation with the clutch-ring (Fig. 7.) The other end of said clutch-lever spring is secured to the outer face of the aforesaid clutch-hub forging so that said spring will exert a constant tension tending to rock the clutch-lever and its dog into clutching position. The opposite arm of the clutch-lever is expanded and so formed that an inner face 45 of said arm normally rests upon the outermost hub 46 of the clutch-hub forging, while an opposed recess 47 of said arm normally makes contact with the free tip 48 of the clutch throw-out lever 49 that is pivoted on the fixed stud 50. The contact of said free tip of the said clutch throw-out lever with the said recess in the clutch-lever normally holds said clutch-lever in the position where the clutch-dog is thrown out of engagement with the driving clutch-ring (Fig. 7.) An opposite arm of the clutch throw-out lever is provided with a stud 51 engaged in the forked end of the auxiliary throw-out lever 52 that is pivoted on the fixed stud 53 and normally under the tension of the throw-out spring 54 whose constant tension acts to draw the throw-out lever away from its aforesaid contact with the clutch-lever. The auxiliary throw-out lever is provided with a downward projection 55 adapted to ride upon the throw-out controlling cam 56 (Fig. 7) that is an integral part of the clutch-hub forging and is immediately without the clutch-ring (Fig. 5.) This throw-out controlling cam is timed to lift the auxiliary throw-out lever, and thereby restore the primary throw-out lever to normal position to make contact with the clutch-lever and throw the clutch-dog out of engagement with the clutch-ring, just after the said throw-out lever has been tripped to release the clutch-lever and the clutch-lever has been carried forward beyond its range of contact with the free tip of said throw-out lever. Just after the high point of said cam has so lifted the auxiliary throw-out lever, restoring the primary throw-out lever to normal position, an upward projection 57 of said primary throw-out lever is caught and held by the free end of the trip-arm 58 (Fig. 7,) which then drops into such engaging position; and thereafter the further rotation of the throw-out controlling cam carries the high point of said cam beyond its point of contact with the downward projection of the auxiliary throw-out lever and leaves said auxiliary throw-out lever free to drop, under the tension of the throw-out spring, whenever the aforesaid trip-arm shall be raised to release the primary throw-out lever. The said trip-arm is keyed to the oscillating trip-shaft 59, journaled in the bearings 60 and 61 in the respectively opposed walls of the drive-frame box; and integral with said trip-arm there is provided a downwardly projecting trip-controlling arm 62 whose free end 63 is adapted to ride upon the trip-controlling cam 64 (Fig. 7) that forms an integral part of the clutch-hub forging immediately without the throw-out controlling cam (Fig. 5.) This trip-controlling cam is so timed that its high point forces outward the trip-controlling arm, and thereby throws the trip-arm into engagement with the primary throw-out lever, just after the stud-bearing end of said primary throw-out lever has been lifted into normal position, so that the positive engagement of the trip-arm with the throw-out lever will be insured before the auxiliary throw-out lever rides off of the high point of the throw-out controlling-cam. And as the clutch-hub forging completes its rotation, the high point of the trip-controlling cam is carried out of contact with the trip-controlling arm so that the trip is left free to be released from engagement with the throw-out lever when the parts return to normal at the conclusion of the rotation of the clutch-hub forging. The clutch-hub forging is a drive fit upon and is keyed, by the Woodruff key 65, to the main cam-shaft, so that the clutching of the clutch-hub with the driving clutch-ring effects the driving of said cam-shaft (Figs. 5 and 8.)

Immediately without the clutch-hub forging, and likewise a drive fit upon and keyed, by the Woodruff key 66, to the cam shaft, there is provided a main-cam forging whereof the main cam 67 forms the inner integral part (Figs. 2 and 5.) Said main cam of course rotates with the driven cam-shaft, and the rotation of said main cam oscillates the main cam-lever 68 that is pivoted on the adjustable eccentric pivot 69 at the bottom of the drive-frame box and is provided centrally with the roller 70 adapted to ride upon the periphery of said main cam. The said main cam lever is under the constant tension of the main cam lever spring 71, tending to hold the roller bearing of said lever into its aforesaid contact with the main cam. And the free end of the upwardly projecting arm of the main cam-lever is linked, by the link connections 72, to the free end of the downwardly projecting rock-arm 73 that is mounted on the main rock-shaft 74 of the adding machine. The contour and timing of the main cam is such that as the roller bearing of the main cam-lever rides up to the high point of the said cam, the main rock-shaft of the adding machine will be positively rocked to the requisite extent to effect the actuation of said machine, and then as the said roller bearing rides down toward the low point of said cam the main rock-shaft of the adding machine will return, under the tension of its own springs and of the main cam-lever spring, at substantially less than the speed at which such return may occur in the normal manual actuation of the adding machine by means of the hand-crank 75 commonly attached to such main rock-shaft, to save shock or jar.

The outermost end of the oscillating trip-shaft, beyond the journal boss 76 that projects outwardly from the detachable wall of the drive-frame box, is provided with the long two-armed trip-connection lever 77 (Fig. 1.) The free end of the arm 78 of said connection-lever is engaged in a lateral recess 79 in the lower end of the operating key-stem 80 that projects upward through the casing of the adding machine and is surmounted by the operating hand-knob 81 adapted to be depressed by the hand or finger of the operator, for the purpose of rocking the trip-shaft and thereby releasing the trip from the clutch throw-out lever and thereby effecting the clutching of the driven members to the driving clutch-ring of the constantly rotating worm-gear. The other arm 82 of the aforesaid trip-shaft connection lever leads back toward the rear of the comptograph adding machine and is provided at its free end with an upwardly projecting tip 83 adapted to enter a slot 84 in the bottom of the comptograph, whenever the trip-shaft is rocked to operate the clutching mechanism (Figs. 1 and 2.) This slot in the bottom of the comptograph is normally unobstructed and so permits the free entry of said upturned tip of said arm, but when the paper being printed upon has been run out of the comptograph and the adding and printing mechanisms are locked against action by the automatic operation of the locking dog 85,—(which locking action will be found described in the second column of page 2 of the specification of the patent to Felt, No. 694,955),—a downward projection 86 of said locking-dog is rocked into position to obstruct the aforesaid slot in the bottom of the machine-casing, and the upturned end of the rearward arm of the aforesaid trip-shaft connection-lever is prevented from entering the said slot and the trip-shaft is thereby locked against oscillation, with the result that the driven members cannot be clutched to the constantly running worm-gear when the comptograph's adding and printing mechanisms have been locked by the running out of the paper that is being printed upon.

Just within the journaling of the trip-shaft in the detachable vertical wall of the drive-frame box, said trip-shaft has rigidly secured to it an interlocking arm 87, whose short upwardly projecting accessory arm 88 is constantly under the tension of the spring 89, which spring thereby constantly tends to rock the trip-shaft in the direction to throw the trip into engagement with the clutch throw-out lever (Figs. 2, 3, 4 and 14.) The interlocking arm 87 projects forward under the adding machine and terminates in a downward projection adapted to be engaged by the hooked end 90 of the interlocking spring-held pawl 91 that is pivoted on the fixed stud 92. This pawl is normally held out of engagement with the said interlocking arm, by means of the engagement of the upwardly projecting tip 93, of said pawl, with the lateral lug 94 on the bifurcated rock-arm 95 that is rigidly fixed upon the main rock-shaft of the adding machine (Figs. 13, 16, 4 and 2.) When the trip-shaft is rocked by the manual depression of the operating hand-knob and its key-stem, the aforesaid interlocking arm 87 is instantly rocked downward and its downwardly projecting free end passes below and engages the hooked end 90 of the said spring-pawl 91 and momentarily prevents the oscillation of said pawl when said pawl is released by the rocking of the aforesaid lug-bearing rock-arm of the main rock-shaft of the adding machine. But as soon as the rotation of the trip-controlling cam has caused the trip-shaft to be restored to normal position, thereby lifting the free end of the said interlocking arm, the aforesaid spring pawl is so oscillated by its spring as to bring its hooked end 90 under the tip of the downwardly projecting end of the interlocking arm, thereby locking said arm, and consequently the trip-shaft, against further movement, until said spring pawl is swung back to normal position by the reengagement, with it, of the lug-bearing rock-arm, just as the main rock-shaft of the adding machine returns to normal position at the close of the complete back and forth rocking of said shaft. In this manner the trip-shaft is locked against movement during the interval intermediate the instant of the release of the trip-controlling lever from the high point of the trip-controlling cam and the instant of the close of the rotation of the driven members and the restoring of the adding machine parts to normal. So that the trip-controlling cam and the pawl-engaged interlocking-arm together provide for the locking of the trip-shaft throughout the entire interval from the instant of gripping of the clutch-dog with the clutch-ring to the instant of the completion of the full rotation of the driven members.

The two arms of the bifurcated rock-arm 95 (Figs. 2, 4, 12, 13 and 16) that is fixed upon the main rock-shaft of the adding machine embrace the rock-arm 73 that is freely mounted on the said main rock-shaft 74, and the said freely mounted rock-arm 73 is provided with two lateral wings 96, 96 adapted to engage the forward faces of the respective forks of the said bifurcated rock-arm 95; so that when said freely mounted rock-arm 73 is drawn backward by the cam-lever link-connections 72, such lateral wings will engage and rock the bifurcated rock-arm that is rigidly secured to the main rock-shaft of the adding machine, and yet said bifurcated rock-arm will at all times be entirely free to be rocked backward, independently of the motor-actuated rock-arm 73, when the main rock-shaft 74 of the adding-machine is directly actuated by the hand-lever normally attached to it. The adding machine may thus be readily actuated at all times by means of its hand-lever without disturbing any of the driven members within or appertaining to the drive-frame box.

The outer portion of the main-cam forging consists of an eccentric 97 (Figs. 5 and 14) that constantly engages a fiber brake-shoe 98 carried by a brake-lever 99 that is mounted on the inner face of the detachable vertical wall of the drive-frame box and is constantly drawn toward the aforesaid eccentric by the tension of the brake-spring 100 (Fig. 14). The said eccentric is so timed that its high point will engage the brake-shoe, and the consequent maximum braking action be effected, just after the high point of the main cam has been carried beyond the roller bearing of the main cam-lever, so that the movement of the driven members will be slowed down and checked as the rotation of the cam-shaft is completed.

To the end that the rotation of the driven members shall be positively stopped at the instant when the clutch-dog is released from the clutch-ring, even if the brake-device has failed to sufficiently reduce the momentum of the parts, the arm of the clutch-lever that engages the free tip of the throw-out lever is provided with an accessory heel 101 (Fig. 7,) so formed and arranged that as the throw-out lever engages with and rocks the clutch-lever into the latter's release position, the said heel will force the inner face of that arm of the clutch-lever against the outer hub of the clutch hub-forging and so jam said arm of the clutch-lever between said outer hub and the free tip of the clutch throw-out lever, positively preventing further forward movement of the clutch-lever, and clutch-hub-forging in which it is journaled, until the clutch throw-out lever is again tripped through the manual actuation of the trip-shaft. It is thus impossible to effect more than one motor actuation of the adding machine by a single depression of the motor operating key.

Against the possibility that the adding machine or its motor connections, under the tension of the various springs that are stretched in the initial rocking of the main rock-shaft, may either run ahead of the motor or cause the cam-shaft to run ahead of the worm-gear, there is provided a secondary centrifugal clutch-dog 102 mounted on the pivot 103 within a segmental peripheral recess 104 in the clutch-hub (Fig. 8). As soon as the primary clutch-dog has gripped the clutch-ring and thereby set the clutch-hub in rotation, this secondary clutch-dog 102 is centrifugally thrown out into the path of the ends of the clutch-notches, and if the clutch-hub, at any time during its further rotation, tends to run ahead of the clutch-ring, this secondary centrifugal clutch-dog will grip the forward curve of the clutch-notch that is then opposite said secondary clutch-dog and will positively block and prevent such running ahead of the clutch-hub. As the clutch-hub completes its rotation, this secondary centrifugal clutch-dog is brought into such position, above the axis of rotation of the clutch-hub, that said dog gravitatively drops back within its retaining recess and so does not interfere with the continued free movement of the driving clutch-ring after the driven clutch-hub has completed its rotation. But even if the said secondary dog fails to gravitatively drop back within its recess, it will be forced back within said recess as soon as the clutch-hub comes to a stop, because said secondary dog, unlike the primary clutch-dog, is arranged to engage only the forward end, instead of the rearward end, of any clutch-notch that is passing, and will be forced back into its recess by contact with the rear end of such passing notch after the rotation of the hub is stopped. Such secondary clutch also acts as a safety-dog to prevent the violent shock that the adding machine would receive if the adding or printing mechanism should become accidentally jammed or blocked, through the breakage or displacement of any part, and the motor-drive mechanism should then rock the main rock-shaft against the great stretching tension of the large main springs 105 (Fig. 11) that normally transmit all movement from the main rock-shaft to the adding and printing mechanism; for if these main springs 105 were so stretched they would be sufficiently powerful to violently jerk forward the main rock-shaft and the entire driven mechanism of the motor-drive as soon as the high point of the main cam of said drive had passed the roller bearing of the main cam-lever, unless the aforesaid secondary safety clutch-dog caught the clutch-ring and prevented the clutch-hub, with the cam-shaft and main cam, from running ahead of the motor-controlled speed of the worm-gear.

The electric current from the power source is led through suitable connecting wires to the switch 106 laterally secured to the drive-frame box (Figs. 1, 3 and 4.) The switch-key is provided with an inwardly projecting stem 107 that terminates just under the connection-arm leading from the trip-shaft to the motor-operating key-stem; and this inner end of the switch-key stem 107 is provided with a flat sided tip 108 so formed and disposed that when the switch-key is turned "off" the said flattened tip will take a vertical position and obstruct and lock against movement the aforesaid trip connection-arm, thereby preventing rocking of the trip-shaft by the motor-operating key while the current is turned off.

Interposed in the electrical circuit including the switch-key and the motor there is provided a fuse box 109 secured to the fixed vertical wall of the drive-frame box. And in the electrical connections intermediate said fuse box and the switch-key there is interposed the slip connection 110, to provide for the entire disconnection of the switch-key from the motor (Figs. 3 and 15.) To permit access to the interior of the drive-frame box without removal of its detachable vertical wall, there is provided in the front wall of said drive-frame box an oil-tight screw-cap 111 (Figs. 1, 7 and 8.)

Suitable wicks are arranged to lubricate the moving parts in the upper portion of the drive-frame box, from the oil supply in which the worm-shaft, in the lower part of said box, runs. And one end of the worm-shaft is provided with an agitator disk 112 whose rotation tends to properly agitate the aforesaid oil bath within which the worm-shaft and worm-gear mesh (Fig. 8.)

To guard against the possibility of the motor-drive being set in action by the depression of the operating-knob when the operator, intending to take a total on the adding machine, has accidentally set the total key only part way back to its proper limit of throw, the said total key has rigidly secured to it an accessory guard-arm 113 whose free end will pass under and engage and check the downward movement of a hooked lateral arm 114 that projects backward, from the motor-operating key-stem, in such relation to said free end of the total-key's guard-arm as to escape the latter only when the total key is either at normal or at the full limit of its backward throw (Fig. 1.)

The general order of operation of the principal parts of the motor-drive mechanism may be summarized as follows:—When the operator turns the electric switch button from "off" to "on," the trip-connection leading from the motor-operating key-stem to the drive-frame trip-shaft is released from the obstruction that the flattened inner end of the switch-stem normally presents to any downward movement of said connection member. If the paper to be printed on has not been run out of the adding machine, the other connection-arm, leading backward from the trip-shaft, is also relieved from the obstruction that would otherwise be presented by the downward projection of the paper-lock dog of the comptograph adding machine. And if the total key of the adding machine is properly at one or the other of the two limits of its throw, the downward movement of the motor-operating key-stem is unobstructed by the lateral guard-arm of the total-key. The operator may then depress the motor-operating hand-knob, and the downward movement of its key-stem will depress the free end of the forward connection-arm of the trip-shaft and thereby rock said trip-shaft. The rocking of the trip-shaft lifts the free end of the trip-arm from its engagement with the clutch throw-out lever, and the free tip of the said throw-out lever will be rocked away from its contact with the clutch-lever, such rocking being effected by the dropping of the auxiliary throw-out lever under the tension of the spring that constantly tends to throw said auxiliary lever downward. The release of the clutch-lever instantly causes the latter to be rocked by its spring, thereby rocking the clutch-dog into the path of the rear end of the clutch-notch that happens to be then passing the socket in which said clutch-dog is normally hidden. This clutching of the clutch-hub forging to the clutch-ring of the worm-gear sets in rotation the said forging and the cam-shaft and main-cam forging, the said forgings and shaft being keyed together. As such rotation commences, the throw-out controlling-cam lifts the auxiliary throw-out lever back into normal position, to reëngage the primary throw-out lever with the clutch-lever when the latter shall have been carried around to normal position. And as the primary throw-out lever is thus restored to normal position, the trip controlling-cam causes the end of the trip-lever to drop into engagement with the said primary throw-out lever; or the said trip may be snapped back into such position by the constant spring tension upon the trip-shaft, if the operator has released the operating-knob before the trip-controlling cam positively forces the trip-shaft to be rocked back to normal. This latching of the throw-out lever in normal position holds the auxiliary throw-out lever in raised position against the tension of its spring; and after the high point of the throw-out controlling-cam passes out from under the auxiliary throw-out lever, leaving the latter in raised position, and as the high point of the trip-controlling cam passes out from under the trip-controlling arm, the interlocking arm of the trip-shaft is engaged, and the trip-shaft prevented from again rocking, by the spring-pawl that has meanwhile been released by the initial rocking of the rock-arm on the main rock-shaft of the adding machine. Such rocking of the said rock-arm and main rock-shaft has been effected by the initial part of the rotation of the main cam of the driven cam-shaft. As the high point of the said main cam passes beyond its engagement with the main cam-lever, the high point of the eccentric on the outer end of the main-cam forging will coact with the spring-held fiber brake-shoe to check the momentum of the said forging, and the cam-shaft, and tend to bring such driven members to a stop at the conclusion of one full rotation. As the said one full rotation of the cam-shaft is completed, the outer face of the free arm of the clutch-lever is reëngaged by the relatched clutch throw-out lever and the said clutch-arm is thereby rocked and the clutch-dog rocked back into its socket out of engagement with the clutch-ring, thereby releasing the driven clutch-hub from the driving worm-gear and its clutch-ring. To bring the driven members to a positive stop at the exact conclusion of one full rotation, the aforesaid outer face of the free arm of the clutch-lever, and more particularly the heel on the extreme tip of such arm, will jam against the free tip of the clutch-throw-out lever, the inner face of the said free arm of the clutch-lever being forced into bearing contact against the outer hub of the clutch-hub forging, in the manner more fully hereinbefore described. And it has already been fully explained how the centrifugally acting secondary or safety clutch-dog is thrown out into engagement with the clutch-ring during the latter part of the rotation of the clutch-hub, so as to prevent any possibility of the clutch-hub and attached cam-shaft, through either momentum or spring impulse, running ahead of the constant speed at which the motor runs the driving worm-gear, this speed being so limited by the winding of the motor as to never exceed the safe limit within which the printing and adding mechanisms may be operated. At the conclusion of the rotation of the driven members, the rock-arm secured to the main rock-shaft of the adding machine returns to normal, and just at the limit of its return releases the spring-pawl from engagement with the interlocking arm of the trip-shaft and so leaves the trip-shaft free to be again rocked, by depression of the motor-operating hand-knob, to effect another motor driven actuation of the adding machine.

My invention is hereinabove set forth as embodied in one particular form of construction, but I do not limit it thereto or to less than all the possible forms wherein the said invention as hereinafter claimed may be embodied and distinguished from prior devices for like purpose.

I claim:—

1. In a motor-driven adding-machine, in combination, adding and printing mechanism, an actuating rock-shaft therefor, a continuously running motor, a driving gear continuously rotated thereby, said gear being recessed on one side to substantially the median plane of the zone of its meshing with its driving means and having an enlarged hub projecting on its other side to compensate said recessing, a clutch-ring rigid with said gear and occupying the periphery of said recess, a rotatable driven member having a clutch-hub fitting within said clutch-ring and projecting in to the inner face of said recess, a clutch-dog borne in the periphery of said clutch-hub and adapted to grip said clutch-ring transversely of the full width thereof, operating connections from the aforesaid driven member to the aforesaid rock-shaft, and manually operable means for controlling the clutch-dog, substantially as specified.

2. In a motor-driven adding-machine, in combination, adding and printing mechanism, an actuating rock-shaft therefor, a continuously running motor, a driving gear continuously rotated thereby, said gear being recessed on one side to substantially the median plane of the zone of its meshing with its driving means and having an enlarged hub projecting on its other side to compensate said recessing, a clutch-ring rigid with said gear and occupying the periphery of said recess, said clutch-ring having internally a series of inwardly-facing clutch-notches, a rotatable driven member having a clutch-hub fitting within said clutch-ring and projecting in to the inner face of said recess, a clutch-dog borne in the periphery of said clutch-hub and adapted to grip said clutch-ring transversely of the full width thereof, operating connections from the aforesaid driven member to the aforesaid rock-shaft, and manually operable means for controlling the clutch-dog, substantially as specified.

3. In a motor-driven adding-machine, in combination, adding and printing mechanism, an actuating rock-shaft therefor, a continuously running motor, a driving gear continuously rotated thereby, a clutch-ring secured to said gear and having internally a series of clutch-notches, each of said clutch-notches having its rearward end of a curvature to coincide with the engaging surface of the clutch-dog, a rotatable driven member extending within said clutch-ring, a clutch-dog for clutching said inward extension of the driven member to said clutch-ring, operating connections from the driven member to the aforesaid rock-shaft, and manually operable means for controlling the clutch-dog, substantially as specified.

4. In a motor-driven adding-machine, in combination, adding and printing mechanism, an actuating rock-shaft therefor, a continuously running motor, a driving gear continuously rotated thereby, a clutch-ring secured to said gear and having internally a continuous series of clutch-notches, each of said clutch-notches having its rearward end of a curvature to coincide with the engaging surface of the clutch-dog, a rotatable driven member extending within said clutch-ring, a clutch-dog for clutching said inward extension of the driven member to said clutch-ring, operating connections upon the driven member to the aforesaid rock-shaft, and manually operable means for controlling the clutch-dog, substantially as specified.

5. In a motor-driven adding-machine, in combination, adding and printing mechanism, an actuating rock-shaft therefor, a continuously running motor, a driving gear continuously rotated thereby, a clutch-ring secured to said gear, a rotatable driven member extending within said clutch-ring, a clutch-dog for clutching said inward extension of the driven member to said clutch-ring, operating connections from the driven member to the aforesaid rock-shaft, manually operable means for controlling the clutch-dog, and a safety-clutch automatically preventing the driven member from running ahead of the driving gear, substantially as specified.

6. In a motor-driven adding-machine, in combination, adding and printing mechanism, an actuating rock-shaft therefor, a continuously running motor, a driving gear continuously rotated thereby, a clutch-ring secured to said gear, a rotatable driven member extending within said clutch-ring, a clutch-dog for clutching said inward extension of the driven member to said clutch-ring, operating connections from the driven member to the aforesaid rock-shaft, manually operable means for controlling the clutch-dog, and a safety-clutch automatically preventing the driven member from running ahead of the driving gear, said safety-clutch being centrifugally thrown into engagement with the clutch-ring, substantially as specified.

7. In a motor-driven adding-machine, in combination, adding and printing mechanism, an actuating rock-shaft therefor, a continuously running motor, a driving gear continuously rotated thereby, a clutch-ring secured to said gear and having internally a series of clutch-notches, a rotatable driven member extending within said clutch-ring, a clutch-dog for clutching said inward extension of the driven member to said clutch-ring, operating connections from the driven member to the aforesaid rock-shaft, manually operable means for controlling the clutch-dog, and a safety-clutch mounted on the driven member within the clutch-ring and automatically preventing said driven member from running ahead of the driving gear, said safety-clutch tending to engage the forward end of any opposed clutch-notch in the clutch-ring, substantially as specified.

8. In a motor-driven adding-machine, in combination, adding and printing mechanism, an actuating rock-shaft therefor, a continuously running motor, a driving gear continuously rotated thereby, a clutch-ring secured to said gear and having internally a continuous series of clutch-notches, each of said clutch-notches being elongated and having its rearward and its forward ends of such curvature as to coincide respectively with the engaging surfaces of the clutch-dog and the safety-clutch, a rotatable driven member extending within said clutch-ring, a clutch-dog for clutching said inward extension of the driven member to said clutch-ring, operating connections from the driven member to the aforesaid rock-shaft, manually operable means for controlling the clutch-dog, and a safety-clutch mounted on the driven member within the clutch-ring and automatically preventing said driven member from running ahead of the driving-gear, said safety-clutch tending to engage the forward end of any opposed clutch-notch in the clutch-ring, substantially as specified.

9. In a motor-driven adding-machine, in combination, adding and printing mechanism, an actuating rock-shaft therefor, a continuously running motor, a driving gear continuously rotated thereby, a clutch-ring secured to said gear, a rotatable driven member in operative relation to said clutch-ring, operating connections from said driven member to the aforesaid rock-shaft, a clutch-dog for clutching said driven member to said clutch-ring, manually operable means for controlling the clutch-dog, and cam mechanism, forming part of the driven member, whereby the said controlling means for the clutch-dog is reset to normal during the rotation of the driven member, substantially as specified.

10. In a motor-driven adding-machine, in combination, adding and printing mechanism, an actuating rock-shaft therefor, a continuously running motor, a driving-gear continuously rotated thereby, a clutch-ring secured to said gear, a rotatable driven member in operative relation to said clutch-ring, operating connections from said driven member to the aforesaid rock-shaft, a clutch-dog for clutching said driven member to said clutch-ring, a spring device constantly tending to move said clutch-dog into clutching position, manually operable trip-mechanism for tripping said spring-pressed clutch-dog into action, and cam mechanism, forming part of the driven member, whereby said trip-mechanism is reset to normal during the rotation of the driven member, substantially as specified.

11. In a motor-driven adding-machine, in combination, adding and printing mechanism, an actuating rock-shaft therefor, a continuously running motor, a driving gear continuously rotated thereby, a clutch-ring secured to said gear, a rotatable driven member in operative relation to said clutch-ring, operating connections from said driven member to the aforesaid rock-shaft, a clutch-dog for clutching said driven member to said clutch-ring, a spring device constantly tending to move said clutch-dog into clutching position, a throw-out device normally holding the clutch-dog thrown out of clutching position, a manually operable trip-device for releasing said throw-out device, and controlling cams, forming part of the driven member, whereby said throw-out device and said trip-device are successively restored to normal during the rotation of the driven member, substantially as specified.

12. In a motor-driven adding-machine, in combination, adding and printing mechanism, an actuating rock-shaft therefor, a continuously running motor, a driving gear continuously rotated thereby, a clutch-ring secured to said gear, a rotatable driven member in operative relation to said clutch-ring, operating connections from said driven member to the aforesaid rock-shaft, a clutch-dog for clutching said driven member to said clutch-ring, a spring device constantly tending to move said clutch-dog into clutching position, a throw-out device normally holding the clutch-dog thrown out of clutching position, a manually operable trip-device for releasing said throw-out device, controlling cams, forming part of the driven member, whereby said throw-out device and said trip device are successively restored to normal during the rotation of the driven member, and an interlocking device to prevent a second actuation of the trip-device until the rock-shaft of the adding machine returns to normal, substantially as specified.

13. In a motor-driven adding-machine, in combination, adding and printing mechanism, an actuating rock-shaft therefor, an electric motor, drive mechanism actuated by said motor and connected with said rock-shaft, manipulative means for operating said motor-drive, a switch for controlling the current supplied to said motor, and a device, controlled by said switch, for locking said manipulative means against operative movement while said switch is at "off" position, substantially as specified.

14. In a motor-driven adding-machine, in combination, adding and printing mechanism, an actuating rock-shaft therefor, a continuously running electric motor, drive mechanism actuated by said motor and connected with said rock-shaft, manipulative means for operating said motor-drive, a switch for controlling the current supplied to said motor, and a device, controlled by said switch, for locking said manipulative means against operative movement while said switch is at "off" position, substantially as specified.

15. In a motor-driven adding-machine, in combination, adding and printing mechanism, an actuating rock-shaft therefor, a locking device for locking said adding and printing mechanism, a motor, drive mechanism actuated by said motor and connected with said rock-shaft, manipulative means for operating said motor drive, and mechanism, controlled by the aforesaid locking device of the adding machine, for locking said manipulative means against operative movement when the adding machine is locked, substantially as specified.

16. In a motor-driven adding-machine, in combination, adding and printing mechanism, an actuating rock-shaft therefor, a locking device for locking said adding and printing mechanism, a continuously running motor, drive mechanism actuated by said motor and connected with said rock-shaft, manipulative means for operating said motor drive, and mechanism, controlled by the aforesaid locking device of the adding machine, for locking said manipulative means against operative movement when the adding machine is locked, substantially as specified.

17. In a motor-driven adding-machine, in combination, adding and printing mechanism, an actuating rock-shaft therefor, a shiftable total-lever for effecting the printing of the registered total, a motor, drive mechanism actuated by said motor and connected with the aforesaid rock-shaft, manipulative means for operating said motor-drive, and a guard device whereby said manipulative means is prevented from operative movement when the aforesaid total-lever is improperly displaced, substantially as specified.

18. In a motor-driven adding-machine, in combination, adding and printing mechanism, an actuating rock-shaft therefor, a continuously running motor, a driving member continuously actuated by said motor, a driven member adapted to be clutched to said driving member, manually operable clutch-mechanism for effecting such clutching-action, operating connections from the said driven member to the aforesaid rock-shaft, and a brake for automatically checking the momentum of said driven member during the return movement of said rock-shaft, substantially as specified.

19. In a motor-driven adding-machine, in combination, adding and printing mechanism, an actuating rock-shaft therefor, a continuously running motor, a driving member continuously actuated by said motor, a driven member adapted to be clutched to said driving member, manually operable clutch-mechanism for effecting such clutching action, operating connections from the said driven member to the aforesaid rock-shaft, and a spring-pressed brake-shoe engaging an eccentric upon said driven member, for automatically checking the momentum of said driven member during the return movement of said rock-shaft, substantially as specified.

20. In a motor-driven adding-machine, in combination, adding and printing mechanism, an actuating rock-shaft therefor, a continuously running motor, a driving member continuously actuated by said motor, a driven member adapted to be clutched to said driving member, operating connections from the said driven member to the aforesaid rock-shaft, manually operable clutch-mechanism for effecting the clutching action, and a positive stop-device for stopping the driven member simultaneously with the release of the clutch at the end of a rotation, substantially as specified.

21. In a motor-driven adding-machine, in combination, adding and printing mechanism, an actuating rock-shaft therefor, a continuously running motor, a driving member continuously actuated by said motor, a driven member adapted to be clutched to said driving member, operating connections from the said driven member to the aforesaid rock-shaft, manually operable clutch-mechanism for effecting the clutching action, and a positive stop-device for stopping the driven member simultaneously with the release of the clutch at the end of a rotation, said device consisting in a stop upon the clutch itself and coacting with its throw-out mechanism at the instant of its release from the driving member, substantially as specified.

22. In a motor-driven adding-machine, in combination, adding and printing mechanism, an actuating rock-shaft therefor, a continuously running electric motor, drive mechanism actuated by said motor and connected with said rock-shaft, manipulative means for operating said motor-drive, a motor circuit, and a fuse-box interposed in said circuit and secured to said motor-drive mechanism, substantially as specified.

23. In a motor-driven adding-machine, in combination, adding and printing mechanism, an actuating rock-shaft therefor, an electric motor having a rotating motor-shaft, a motor drive mechanism having a driving worm-shaft actuated by said motor-shaft, said worm-shaft and said motor-shaft being detachably coupled by a key-and-socket flexible coupling, operating connections from the motor-drive mechanism to the aforesaid rock-shaft, and manipulative means for controlling the motor-driven actuation of the adding machine, substantially as specified.

24. In a motor-driven adding-machine, in combination, adding and printing mechanism, an actuating rock-shaft therefor, a continuously running motor, a driving gear continuously rotated thereby, a driven shaft freely supporting said gear and rigidly keyed to a clutch-hub and clutch-controlling cam and main cam and brake-eccentric, a clutch for clutching said driven hub to said gear, trip mechanism for actuating said clutch and controlled by said clutch-controlling cam, operating connections from said main cam to the aforesaid rock-shaft, a brake-shoe device coöperating with said brake-eccentric to check the rotation of the driven members, and manipulative means for operating the aforesaid trip-mechanism to effect the clutching action, substantially as specified.

25. In a motor-driven adding-machine, in combination, adding and printing mechanism, an actuating rock-shaft therefor, a continuously running motor, a driving member continuously rotated thereby, a driven member adapted to be clutched to said driving member, operating connections from said driven member to said rock-shaft, a clutch device normally tending to effect said clutching action, a trip-shaft and trip-member normally engaging and movable to release said clutch-device, a manually operable connection for moving said trip-shaft, an interlocking device to prevent such clutch-releasing movement of said trip-shaft while the adding and printing mechanisms are in operation, and auxiliary locking connections to prevent such clutch-releasing movement of said trip-shaft when the printing adding machine is not in normal condition for operation, substantially as specified.

In testimony whereof, I have hereunto set my hand in the presence of two subscribing witnesses.

FREDERICK A. NIEMANN.

Witnesses:
HENRY LOVE CLARKE,
HARRY B. WYETH.